US012776443B2

(12) United States Patent
Kuriyama

(10) Patent No.: US 12,776,443 B2
(45) Date of Patent: *Oct. 27, 2026

(54) PRODUCTION METHOD FOR NANOCRYSTALLINE ALLOY RIBBON HAVING RESIN FILM

(71) Applicant: Proterial, Ltd., Tokyo (JP)

(72) Inventor: Yasuo Kuriyama, Tokyo (JP)

(73) Assignee: Proterial, Ltd., Tokyo (JP)

( * ) Notice: Subject to any disclaimer, the term of this patent is extended or adjusted under 35 U.S.C. 154(b) by 287 days.

This patent is subject to a terminal disclaimer.

(21) Appl. No.: 17/612,763

(22) PCT Filed: May 21, 2020

(86) PCT No.: PCT/JP2020/020159

§ 371 (c)(1),
(2) Date: Nov. 19, 2021

(87) PCT Pub. No.: WO2020/235643

PCT Pub. Date: Nov. 26, 2020

(65) Prior Publication Data

US 2022/0293313 A1 Sep. 15, 2022

(30) Foreign Application Priority Data

May 21, 2019 (JP) ................................ 2019-095278
May 21, 2019 (JP) ................................ 2019-095279

(51) Int. Cl.
*H01F 41/02* (2006.01)
*B32B 37/06* (2006.01)
(Continued)

(52) U.S. Cl.
CPC ............ *H01F 41/02* (2013.01); *B32B 37/06* (2013.01); *C09J 7/40* (2018.01); *C21D 1/26* (2013.01);
(Continued)

(58) Field of Classification Search
CPC .............. C21D 1/26; C21D 1/28; C21D 1/30; C21D 1/32; C21D 6/00; C21D 6/001;
(Continued)

(56) References Cited

U.S. PATENT DOCUMENTS 6,031,341 A * 2/2000 Yoshizawa .......... H01F 1/15333
315/276
6,830,634 B2 12/2004 Herzer et al.
(Continued)

FOREIGN PATENT DOCUMENTS

CN 1659289 A 8/2005
CN 101351571 A 1/2009
(Continued)

OTHER PUBLICATIONS

Office Action, including Search Report, for Taiwanese Patent Application No. 109116966, dated Apr. 26, 2023, 9 pages.
(Continued)

*Primary Examiner* — Vanessa T. Luk
(74) *Attorney, Agent, or Firm* — Westman, Champlin & Koehler, P.A.

(57) ABSTRACT

A method for producing a nanocrystalline alloy ribbon having a resin film, the method including a step of preparing an amorphous alloy ribbon capable of nanocrystallization, a step of performing a thermal treatment for nanocrystallization of the amorphous alloy ribbon with tension exerted on the amorphous alloy ribbon, to obtain a nanocrystalline alloy ribbon, and a step of causing the nanocrystalline alloy ribbon to be held on the resin film with an adhesive layer therebetween.

5 Claims, 5 Drawing Sheets

(51) Int. Cl.

| | |
|---|---|
| ***C09J 7/40*** | (2018.01) |
| ***C21D 1/26*** | (2006.01) |
| ***C21D 8/02*** | (2006.01) |
| ***C21D 8/0221*** | (2026.01) |
| ***C21D 8/0247*** | (2026.01) |
| ***C21D 8/0278*** | (2026.01) |
| ***H01F 1/147*** | (2006.01) |
| ***H01F 1/153*** | (2006.01) |

(52) U.S. Cl.

CPC ............. *C21D 8/02* (2013.01); *C21D 8/0221* (2013.01); *C21D 8/0252* (2013.01); *C21D 8/0278* (2013.01); *H01F 1/14716* (2013.01); *H01F 1/15333* (2013.01); *H01F 1/15375* (2013.01); *H01F 1/15383* (2013.01); *H01F 41/024* (2013.01); *C21D 2201/03* (2013.01)

(58) Field of Classification Search

CPC ........ C21D 6/002; C21D 6/004; C21D 6/005; C21D 6/007; C21D 6/008; C21D 8/00; C21D 8/005; C21D 8/0252; C21D 8/0278; C21D 8/0284; C21D 8/12; C21D 8/1211; C21D 8/1244; C21D 8/125; C21D 8/1277; C21D 8/1283; C21D 2201/03; H01F 1/14716; H01F 1/14725; H01F 1/14775; H01F 1/14783; H01F 1/153; H01F 1/15308; H01F 1/15333; H01F 1/15375; H01F 1/15383; H01F 1/16; H01F 1/18; H01F 3/02; H01F 3/04; H01F 41/02; H01F 41/0206; H01F 41/0233; H01F 41/024

See application file for complete search history.

(56) References Cited

U.S. PATENT DOCUMENTS

| | | | | |
|---|---|---|---|---|
| 7,905,966 | B2 | 3/2011 | Waeckerle et al. | |
| 8,083,867 | B2 | 12/2011 | Yoshizawa et al. | |
| 9,252,611 | B2 | 2/2016 | Lee et al. | |
| 9,504,194 | B2 | 11/2016 | Lee et al. | |
| 9,930,818 | B2 | 3/2018 | Lee et al. | |
| 10,010,018 | B2 | 6/2018 | Lee et al. | |
| 10,014,724 | B2 | 7/2018 | Riehl et al. | |
| 10,020,104 | B2 | 7/2018 | Watanabe et al. | |
| 10,123,467 | B2 | 11/2018 | Lee et al. | |
| 11,006,553 | B2 | 5/2021 | Lee et al. | |
| 11,322,281 | B2 | 5/2022 | Ohta | |
| 2003/0226618 | A1 | 12/2003 | Herzer et al. | |
| 2008/0196795 | A1 | 8/2008 | Waeckerle et al. | |
| 2009/0065100 | A1 | 3/2009 | Yoshizawa et al. | |
| 2014/0246923 | A1 | 9/2014 | Riehl et al. | |
| 2014/0362505 | A1* | 12/2014 | Jang | H05K 9/0075 361/679.4 |
| 2015/0123604 | A1 | 5/2015 | Lee et al. | |
| 2016/0055952 | A1 | 2/2016 | Watanabe et al. | |
| 2016/0081237 | A1 | 3/2016 | Lee et al. | |
| 2016/0081238 | A1 | 3/2016 | Lee et al. | |
| 2016/0081239 | A1 | 3/2016 | Lee et al. | |
| 2016/0081240 | A1 | 3/2016 | Lee et al. | |
| 2019/0045676 | A1 | 2/2019 | Lee et al. | |
| 2019/0074115 | A1 | 3/2019 | Ohta | |
| 2020/0194169 | A1* | 6/2020 | Jang | H02J 50/12 |
| 2021/0185865 | A1 | 6/2021 | Lee et al. | |

FOREIGN PATENT DOCUMENTS

| | | | | |
|---|---|---|---|---|
| CN | 101371321 | A | 2/2009 | |
| CN | 104376950 | A | 2/2015 | |
| CN | 104900383 | A | 9/2015 | |
| CN | 105074838 | A | 11/2015 | |
| CN | 105074848 | A | 11/2015 | |
| CN | 105593382 | A | 5/2016 | |
| CN | 105632678 | A | 6/2016 | |
| CN | 107742575 | A | 2/2018 | |
| CN | 108701530 | A | 10/2018 | |
| CN | 109716463 | A | 5/2019 | |
| EP | 3050977 | A1 | 8/2016 | |
| FR | 2823507 | A1 | 10/2002 | |
| JP | S61227156 | A | 10/1986 | |
| JP | 2004160513 | A | 6/2004 | |
| JP | 2005529233 | A | 9/2005 | |
| JP | 2008112830 | A | 5/2008 | |
| JP | 2011134959 | A | 7/2011 | |
| JP | 2015505166 | A | 2/2015 | |
| JP | 2019095278 | A | 6/2019 | |
| JP | 2019095279 | A | 6/2019 | |
| KR | 10-1889226 | B1 * | 8/2018 | H01F 1/12 |
| TW | 201804006 | A | 2/2018 | |
| WO | 2014157526 | A1 | 10/2014 | |
| WO | 2015046140 | A1 | 4/2015 | |
| WO | WO-2017150441 | A1 * | 9/2017 | H01F 1/153 |
| WO | 2018062310 | A1 | 4/2018 | |
| WO | WO-2019054777 | A1 * | 3/2019 | H01F 27/366 |

OTHER PUBLICATIONS

International Search Report and Written Opinion for International Application No. PCT/JP2020/020159, dated Aug. 14, 2020, 9 pages.

Office Action, including Search Report, for Chinese Patent Application No. 202080030755.X, dated Feb. 17, 2023, 14 pages.

International Search Report and Written Opinion for International Application No. PCT/JP2020/020158, dated Aug. 4, 2020, 9 pages.

Second Office Action, including Search Report, for Chinese Patent Application No. 202080031374.3, dated Jul. 29, 2023, 18 pages.

Decision of Refusal for Japanese Patent Application No. 2021-520850, drafted Feb. 16, 2023, 6 pages.

First Office Action, including Search Report, for Chinese Patent Application No. 202080031374.3, dated Mar. 31, 2023, 20 pages.

Office Action, including Search Report, for Taiwanese Patent Application No. 109116967, dated Aug. 24, 2023, 11 pages.

Notice of Reasons for Refusal for Japanese Patent Application No. 2021-520850, drafted Aug. 31, 2022, 6 pages.

Third Office Action, including Search Report, for Chinese Patent Application No. 202080031374.3, dated Dec. 21, 2023, 14 pages.

Decision of Refusal, for Chinese Patent Application No. 202080031374.3, dated Mar. 23, 2024, 22 pages.

Non-Final Rejection for U.S. Appl. No. 17/612,766, mailed May 21, 2024, 28 pages.

Japanese Notice of Reasons for Refusal, for Japanese Patent Application No. 2023-083520, dated Jul. 2, 2024, 6 pages.

Final Rejection for U.S. Appl. No. 17/612,766, mailed Oct. 15, 2024, 22 pages.

Notice of Allowance for U.S. Appl. No. 17/612,766, mailed May 7, 2025, 11 pages.

* cited by examiner

PRODUCTION METHOD FOR NANOCRYSTALLINE ALLOY RIBBON HAVING RESIN FILM

CROSS REFERENCE TO RELATED APPLICATIONS

This application is a National Stage of International Application No. PCT/JP2020/020159, filed May 21, 2020, which claims priority under 35 U.S.C. § 119(a) to Japanese Patent Application Nos. 2019-095278 and 2019-095279, each filed May 21, 2019. Each of the above applications is hereby expressly incorporated by reference, in its entirety, into the present application.

TECHNICAL FIELD

The present disclosure relates to a method for producing a nanocrystalline alloy ribbon having a resin film.

BACKGROUND ART

Electronic devices such as smart phones, tablet type information terminals, or mobile phones have rapidly become widely used in recent years. Especially, mobile phones (for example, smart phones), Web terminals, music players, and the like are required to be able to be used continuously for a long time for convenience as mobile devices. In these small size mobile devices, a secondary battery such as a lithium ion battery is used as the power source. Regarding the charging method for this secondary battery, there are two methods. Namely, a contact charging method in which charging is performed by bringing the electrode on the power receiving side into direct contact with the electrode on the power feeding side, and a wireless charging method in which transmission coils are provided on each of the power feeding side and the power receiving side, and charging is performed by power transmission utilizing electromagnetic induction. In the wireless charging method, an electrode for directly contacting the power feeding device and the power receiving device is not needed, and thus, it is possible to also charge a different power receiving device by using the same power feeding device. Further, the wireless charging method is a technique which can be used not only in mobile devices but also in other electronic devices, electronic vehicles, unmanned aerial vehicles, and the like.

In the wireless charging method, the magnetic flux generated in the primary transmission coil of the power feeding device causes an electromotive force to generate in the secondary transmission coil of the power receiving device through the housings of the power feeding device and the power receiving device, whereby power feeding is performed. In order to obtain a high power transmission efficiency, a magnetic sheet is provided, as a coil yoke, on the opposite side of the transmission coil from the contact surface of the power feeding device and the power receiving device. Such a magnetic sheet has the following roles.

The first role is a role as a magnetic shielding material. For example, when a leakage magnetic flux generated during the charging operation in the wireless charging device flows to other components, such as a metal member that constitutes the secondary battery, these components generate heat due to the eddy current. The magnetic sheet can suppress this generation of heat, as a magnetic shielding material.

The second role of the magnetic sheet is to act as a yoke member that recirculates the magnetic flux generated in the coil during charging.

Conventionally, a ferrite material has been mainly used as a soft magnetic material used for magnetic sheets in wireless charging devices; however, recently, a soft magnetic alloy ribbon made from an amorphous alloy or a nanocrystalline alloy is beginning to be applied, as described in Japanese Patent Application Laid-Open (JP-A) No. 2008-112830.

JP-A No. 2008-112830 discloses a method for producing a magnetic sheet, the method including a step of adhering a thin sheet-shaped magnetic body (an alloy ribbon) onto a sheet base material with an adhesive layer sandwiched therebetween to form a magnetic sheet, and a step of dividing the alloy ribbon into a plurality of pieces by an external force, while maintaining the state in which the alloy ribbon is adhered to the sheet base material, in order to improve the Q value or reduce eddy current loss. Further, JP-A No. 2008-112830 discloses that improvement in the Q value can be intended in the case of using the magnetic sheet, for example, as a magnetic body for an inductor, by applying an external force to the alloy ribbon and dividing the alloy ribbon into a plurality of pieces. Further, JP-A No. 2008-112830 discloses that, in the case of using the magnetic sheet as a magnetic body for magnetic shielding, eddy current loss can be reduced by cutting the current path of the alloy ribbon into pieces. Further, JP-A No. 2008-112830 discloses that, in the case of dividing the alloy ribbon into a plurality of pieces, it is preferable that the area of the divided magnetic body piece is in a range of from 0.01 $mm^2$ to 25 $mm^2$.

Moreover, International Publication (WO) 2014/157526 discloses a magnetic sheet using a ribbon which is obtained by heat treating a Fe-based amorphous and which has a magnetic permeability μr of from 220 to 770 at 500 kHz.

SUMMARY OF INVENTION

Technical Problem

In a case in which a magnetic sheet using an alloy ribbon divided into a plurality of pieces is used in a wireless charging device, magnetic permeability is often used as the characteristic for quantifying the state of division. In the case of using such a magnetic sheet in mobile phone, which are becoming more widely used, or the like, a magnetic sheet having an AC relative magnetic permeability μr of from 100 to 2,000 at 128 kHz is required.

However, in order to obtain a magnetic sheet having this numerical value of magnetic permeability, it is necessary to finely divide a soft magnetic alloy ribbon at intervals of about 1 mm.

In general, an alloy ribbon has a thickness of from 5 μm to 50 μm; however, since the elastic force of the resin film of the magnetic sheet is large, it is extremely difficult to finely divide the internal soft magnetic alloy ribbon into a plurality of pieces, even if an external force is applied through the resin film.

In a magnetic sheet using a Fe amorphous, which is described in WO 2014/157526, by slightly crystallizing an amorphous alloy, the magnetic permeability with an order of magnitude of $10^3$ in the amorphous state is made to be from 220 to 770. However, in a nanocrystalline alloy ribbon, the magnetic permeability is an order of magnitude greater, and it is difficult to lower the AC relative magnetic permeability μr to be from 100 to 2000. Further, concerning the nanocrystalline alloy, since a microcrystal structure is formed by performing a thermal treatment for nanocrystallization, the degree of lowering in magnetic permeability in accordance with the thermal treatment as described in WO 2014/157526 is not large. When the thermal treatment which lowers the magnetic permeability to be within the above range is performed, the ribbon becomes brittle and it is hard to handle in adhering the ribbon to the sheet base material.

Accordingly, the problem to be addressed by the invention is to make it possible to easily produce a nanocrystalline alloy ribbon having an AC relative magnetic permeability μr of from 100 to 2,000 at 128 kHz, and to provide a method for producing a nanocrystalline alloy ribbon having a resin film by using the nanocrystalline alloy ribbon.

The nanocrystalline alloy ribbon having a resin film can be applied to, for example, a magnetic sheet. Further, this nanocrystalline alloy ribbon having a resin film can also be applied for use other than a magnetic sheet.

Solution to Problem

Specific means for addressing the above problems include the following aspects.

<1> A method for producing a nanocrystalline alloy ribbon having a resin film, the method including a step of preparing an amorphous alloy ribbon capable of nanocrystallization, a step of performing a thermal treatment for nanocrystallization of the amorphous alloy ribbon with tension exerted on the amorphous alloy ribbon, to obtain a nanocrystalline alloy ribbon, and a step of causing the nanocrystalline alloy ribbon to be held on the resin film with an adhesive layer therebetween.

<2> The method for producing a nanocrystalline alloy ribbon having a resin film according to <1>, wherein an AC relative magnetic permeability μr of the nanocrystalline alloy ribbon is from 100 to 2,000 at 128 kHz.

<3> The method for producing a nanocrystalline alloy ribbon having a resin film according to <1> or <2>, the method further including a step of stacking a plurality of nanocrystalline alloy ribbons on the resin film.

<4> The method for producing a nanocrystalline alloy ribbon having a resin film according to <3>, wherein the adhesive layer is provided between the plurality of nanocrystalline alloy ribbons that are stacked.

<5> The method for producing a nanocrystalline alloy ribbon having a resin film according to any one of <1> to <4>, wherein the amorphous alloy ribbon is a long amorphous alloy ribbon produced by roll cooling, and the step of obtaining a nanocrystalline alloy ribbon includes a step of allowing the amorphous alloy ribbon to proceed in the longitudinal direction of the amorphous alloy ribbon, while applying tension to the amorphous alloy ribbon in the longitudinal direction, and continuously performing a thermal treatment for nanocrystallization with respect to the amorphous alloy ribbon.

<6> The method for producing a nanocrystalline alloy ribbon having a resin film according to any one of <1> to <5>, the method further including a step of forming a crack in the nanocrystalline alloy ribbon.

<7> The method for producing a nanocrystalline alloy ribbon having a resin film according to <6>, wherein the step of forming a crack in the nanocrystalline alloy ribbon includes a step of directly applying an external force to the nanocrystalline alloy ribbon.

<8> The method for producing a nanocrystalline alloy ribbon having a resin film according to any one of <1> to <7>, wherein the nanocrystalline alloy ribbon includes a composition represented by the Formula: $(Fe_{1-a}M_a)_{100-x-y-z-\alpha-\beta-\gamma}Cu_xSi_yB_zM'_\alpha M''_\beta X_\gamma$ (atom %), in the Formula, M represents Co and/or Ni, M' represents at least one element selected from the group consisting of Nb, Mo, Ta, Ti, Zr, Hf, V, Cr, Mn, and W, M" represents at least one element selected from the group consisting of Al, platinum group elements, Sc, rare-earth elements, Zn, Sn, and Re, X represents at least one element selected from the group consisting of C, Ge, P, Ga, Sb, In, Be, and As, and a, x, y, z, α, β, and γ satisfy $0 \le a \le 0.5$, $0.1 \le x \le 3$, $0 \le y \le 30$, $0 \le z \le 25$, $5 \le y+z \le 30$, $0 \le \alpha \le 20$, $0 \le \beta \le 20$, and $0 \le \gamma \le 20$, respectively.

<9> The method for producing a nanocrystalline alloy ribbon having a resin film according to <8>, wherein, in the Formula, a, x, y, z, α, β, and γ satisfy $0 \le a \le 0.1$, $0.7 \le x \le 1.3$, $12 \le y \le 17$, $5 \le z \le 10$, $1.5 \le \alpha \le 5$, $0 \le \beta \le 1$, and $0 \le \gamma \le 1$, respectively.

Advantageous Effects of Invention

According to the present disclosure, it becomes possible to easily produce a nanocrystalline alloy ribbon having an AC relative magnetic permeability μr of from 100 to 2,000 at 128 kHz, and a method for producing a noncrystalline alloy ribbon having a resin film by using the nanocrystalline alloy ribbon may be provided.

DESCRIPTION OF EMBODIMENTS

Figure 1:
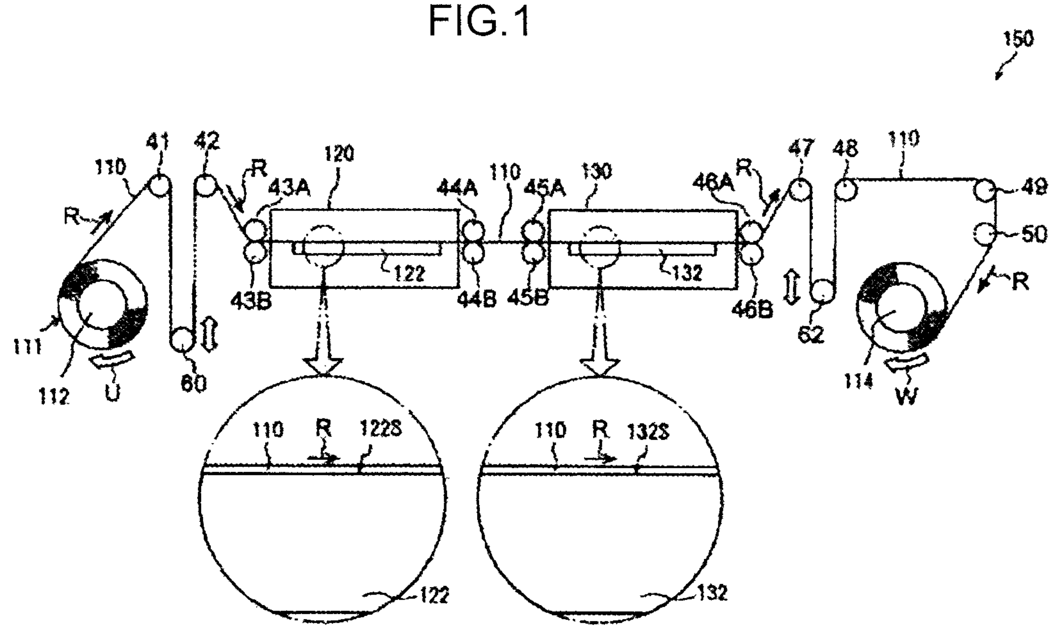
FIG. 1 is a schematic view of an in-line annealing device showing one embodiment of the step of obtaining a nanocrystalline alloy ribbon according to the present disclosure.

Hereinafter, the present disclosure will be specifically described with reference to the embodiments of the present disclosure; however, the present disclosure is not restricted to these embodiments by any means.

In a case in which the embodiments of the present disclosure are described with reference to the drawings, the description of overlapping constituting elements and symbols in the drawings may be omitted. In the drawings, constituent elements shown by using the same symbol mean that the constituent elements are the same. The dimensional ratio in the drawings does not necessarily represent the actual dimensional ratio.

In the present disclosure, a numerical range described by using "to" represents a range including numerical values described in front of and behind "to", as a lower limit value and an upper limit value, respectively. In the present disclosure, in the numerical ranges described step by step, the upper limit value or the lower limit value described in one numerical range may be replaced with the upper limit value or the lower limit value of other numerical ranges described step by step. Further, in the numerical ranges described in the present disclosure, the upper limit value or the lower limit value described in one numerical range may be replaced with the value described in the Examples.

In the present disclosure, the ordinal numerals (for example, "first" and "second") are terms used for distinguishing the constituent elements, and do not limit the number of constituent elements and the superiority or inferiority of the constituent elements.

In the present disclosure, the term "step" includes not only an independent step, but also a case which cannot be clearly distinguished from other step, as long as the predetermined purpose of the step is achieved.

In the present disclosure, a combination of two or more preferable aspects is a more preferable aspect.

The method for producing a nanocrystalline alloy ribbon having a resin film according to an embodiment of the present disclosure includes a step of preparing an amorphous alloy ribbon capable of nanocrystallization, a step of performing a thermal treatment for nanocrystallization of the amorphous alloy ribbon with tension exerted on the amorphous alloy ribbon, thereby obtaining a nanocrystalline alloy ribbon, and a step of causing the nanocrystalline alloy ribbon to be held on the resin film with an adhesive layer therebetween.

First, the step of preparing an amorphous alloy ribbon capable of nanocrystallization, according to the embodiment of the present disclosure, will be described.

The amorphous alloy ribbon capable of nanocrystallization is an alloy ribbon in the amorphous state, in which nanocrystals are formed by performing a thermal treatment. The nanocrystallizable amorphous alloy ribbon can be produced, for example, by rapidly solidifying a molten metal which is blended into an alloy composition to be a nanocrystalline alloy. Concerning the method for rapidly solidifying a molten metal, a method called a single roll method or a method called a twin roll method can be used. These are methods using roll cooling. A well-known method can be applied to this method using roll cooling. According to this method using roll cooling, a molten metal is continuously quenched to obtain a long amorphous alloy ribbon. The one that has been rapidly solidified in a ribbon shape does not have nanocrystals, and is in the amorphous state. Thereafter, by performing thermal treatment, nanocrystals are formed (nanocrystallization), to become a nanocrystalline alloy ribbon. This long amorphous alloy ribbon is often wound around a winding shaft, and transported as a wound body in a roll form. Note that, there is also a case in which fine crystals exist in the amorphous alloy ribbon capable of nanocrystallization. In this case, the fine crystal becomes a nanocrystal by thermal treatment.

This nanocrystalline alloy ribbon has, for example, a composition represented by Formula: $(Fe_{1-a}M_a)_{100-x-y-z-\alpha-\beta-\gamma}Cu_xSi_yB_zM'_\alpha M''_\beta X_\gamma$ (atom %), In the above Formula, M represents Co and/or Ni, M' represents at least one element selected from the group consisting of Nb, Mo, Ta, Ti, Zr, Hf, V, Cr, Mn, and W, M" represents at least one element selected from the group consisting of Al, platinum group elements, Sc, rare-earth elements, Zn, Sn, and Re, X represents at least one element selected from the group consisting of C, Ge, P, Ga, Sb, In, Be, and As, and a, x, y, z, α, β, and γ satisfy 0≤a≤0.5, 0.1≤x'3, 0≤y≤30, 0≤z≤25, 5≤y+z≤30, 0≤α≤20, 0≤β≤20, and 0≤γ≤20, respectively. The one having a composition represented by the above Formula can be used. Preferably, in the above Formula a, x, y, z, α, β, and γ satisfy 0≤a≤0.1, 0.7≤x≤1.3, 12≤y≤17, 5≤z≤10, 1.5≤α≤5, 0≤γ≤1, and 0≤γ≤1.

In the step of preparing an amorphous alloy ribbon capable of nanocrystallization, the amorphous alloy ribbon capable of nanocrystallization may be produced or may be purchased.

Next, the step of performing a thermal treatment for nanocrystallization of the amorphous alloy ribbon with tension exerted on the amorphous alloy ribbon, to obtain a nanocrystalline alloy ribbon, according to the embodiment of the present disclosure, will be described.

By performing a thermal treatment for nanocrystallization of the nanocrystallizable amorphous alloy ribbon with tension exerted on the amorphous alloy ribbon, it is possible to adjust the AC relative magnetic permeability μr of the nanocrystalline alloy ribbon. According to this step, it is preferable to obtain a nanocrystalline alloy ribbon having an AC relative magnetic permeability μr of from 100 to 2,000. Note that, the nanocrystalline alloy is an alloy having a microcrystal structure with a particle diameter of 100 nm or less.

In the measurement of AC relative magnetic permeability μr, the impedance (Z) and the inductance (Ls) of the series equivalent circuit are measured using an impedance analyzer (E4990A (trade name), manufactured by Keysight Technologies, measuring jig: 16454A (trade name)) at an OSC level of 0.03 V, at a temperature of 25° C., and a frequency of 128 kHz. The AC relative magnetic permeability μr is calculated based on the equation described below. As to the sample for evaluation, the one obtained by stacking from 10 layers to 20 layers of punched sheets in a ring shape having an outer diameter of 20 mm and an inner diameter of 9 mm is used.

$$\mu r = 2\pi \times Z/(2\pi + \mu 0 \times f \times t \times n \times \ln(OD/ID))$$

Z: Absolute value of impedance f: Frequency (Hz)

t: Thickness (m) of the ribbon n: Number of layers

μ0: Vacuum permeability ($4\times\pi\times10^{-7}$ H/m)

OD: Outer diameter (m)

ID: Inner diameter (m)

In the embodiment of the present disclosure, for example, the amorphous alloy ribbon is run continuously with tension exerted on the amorphous ribbon, and a part of the amorphous alloy ribbon is nanocrystallized. Nanocrystallization is performed by applying heat with a temperature equal to or higher than the crystallization initiating temperature. For example, a means of the amorphous alloy ribbon to pass through a thermal treatment furnace or a means of bringing the amorphous alloy ribbon into contact with a heat transfer medium can be adopted. In the specific embodiment of the present disclosure, the amorphous alloy ribbon in a tensioned state is run continuously while maintaining contact with a heat transfer medium. The heat transfer medium that comes into contact with the continuously running amorphous alloy ribbon is arranged in the middle of the traveling route of the amorphous alloy ribbon. The amorphous alloy ribbon is heat-treated by passing through the heat transfer medium to become a nanocrystalline alloy ribbon.

In the method of performing thermal treatment while allowing the amorphous alloy ribbon to run continuously as described above, the direction of the tension applied to the amorphous alloy ribbon is the same as the traveling direction of the amorphous alloy ribbon just before contacting the heat transfer medium, the traveling direction of the amorphous alloy ribbon at the time of contacting the heat transfer medium, and the traveling direction of the nanocrystalline alloy ribbon just after separating from the heat transfer medium, each of which is linear. As described above, in the case of performing thermal treatment while allowing the amorphous alloy ribbon to run, the amorphous alloy ribbon is a long amorphous alloy ribbon, and the longitudinal direction of the amorphous alloy ribbon and the direction of the tension to be applied to the amorphous alloy ribbon are the same. Here, the direction of the tension to be applied to the amorphous alloy ribbon is the same as the direction along the rotational direction of the roll in the case of producing the amorphous alloy ribbon by roll cooling. The direction along the rotational direction of the roll is also referred to as the casting direction. The direction of the tension to be applied to the amorphous alloy ribbon is the same as the casting direction. As described above, the step of obtaining a nanocrystalline alloy ribbon may include a step of allowing the amorphous alloy ribbon to proceed in the longitudinal direction of the amorphous alloy ribbon, while applying tension to the amorphous alloy ribbon in the longitudinal direction, and continuously performing a thermal treatment for nanocrystallization with respect to the amorphous alloy ribbon.

However, the amorphous alloy ribbon may run in a zig zag line while passing through transporting rollers or the like in the upstream side of "just before contacting the heat transfer medium" in the traveling direction. Similarly, the nanocrystalline alloy ribbon obtained from the amorphous alloy ribbon may run in a zig zag line while passing through transporting rollers or the like in the downstream side of "just after separating from the heat transfer medium" in the traveling direction.

The tension to be applied to the amorphous alloy ribbon is preferably from 1.0 N to 50.0 N, more preferably from 2.0 N to 40.0 N, and particularly preferably from 3.0 N to 35.0 N.

When the tension is 1.0 N or more, the magnetic permeability can be reduced sufficiently.

When the tension is 50.0 N or less, breakage of the amorphous alloy ribbon or nanocrystalline alloy ribbon can be further suppressed.

In the thermal treatment for nanocrystallization according to the embodiment of the present disclosure, the temperature of the amorphous alloy ribbon is elevated to the end-point temperature of equal to or higher than the crystallization temperature Tc1 (for example, 430° C. or higher) of the amorphous alloy ribbon. Thereby, nanocrystallization proceeds in the structure of the alloy ribbon.

The end-point temperature is preferably from 430° C. to 600° C.

When the end-point temperature is 600° C. or lower (especially, in a case in which the content of B is from 10 atom % to 20 atom %), for example, the precipitation frequency of the Fe—B compound, which may deteriorate the soft magnetic property (Hc, Bs, or the like) of the nanocrystalline alloy ribbon, can be further reduced.

Further, it is preferable that the end-point temperature is set to the same temperature as the temperature of the heat transfer medium.

Further, in the case of using a heat transfer medium in the thermal treatment for nanocrystallization, examples of the heat transfer medium include a plate, a twin roll, and the like. A plate-shaped heat transfer medium is preferable, since the contact area that comes into contact with the amorphous alloy ribbon, is large. It is preferable that the contact surface of the plate-shaped heat transfer medium is a flat plane: however, a slightly curved face may be provided. Further, a suction hole may be provided on the contact surface of the heat transfer medium with the alloy ribbon to make it possible to apply suction under reduced pressure in the suction hole. Thereby, the alloy ribbon can be sucked and adsorbed to the surface of the heat transfer medium, the surface having a suction hole. As a result, the contact property of the alloy ribbon with respect to the heat transfer medium is improved, and the thermal treatment efficiency can be improved.

Examples of the material of the heat transfer medium include copper, a copper alloy (bronze, brass, or the like), aluminum, iron, and an iron alloy (stainless steel or the like). Among them, copper, a copper alloy, and aluminum have a high thermal conductivity (heat transfer coefficient), which are thus preferable.

The heat transfer medium may be subjected to plating treatment such as Ni plating or Ag plating.

Further, thermal treatment can be performed by separately providing a means for heating this heat transfer medium, bringing the heated heat transfer medium into contact with an amorphous alloy ribbon, and heating the amorphous alloy ribbon. Further, the periphery of the heat transfer medium may be surrounded by an arbitrary member.

Further, in the embodiment of the present disclosure, after elevating the temperature to the end-point temperature described above, the temperature of the nanocrystalline alloy ribbon may be maintained for a certain period of time on the heat transfer medium.

Further, in the embodiment of the present disclosure, it is preferable to cool (preferably, to room temperature) the obtained nanocrystalline alloy ribbon.

Moreover, the embodiment of the present disclosure may include winding up the obtained nanocrystalline alloy ribbon (preferably, the nanocrystalline alloy ribbon that has been cooled) to obtain a wound body of the nanocrystalline alloy ribbon.

The thickness of the amorphous alloy ribbon according to the embodiment of the present disclosure is preferably in a range of from 10 μm to 50 μm. When the thickness is less than 10 μm, the mechanical strength of the alloy ribbon itself is low, so that it is difficult to stably cast a long alloy ribbon. When the thickness exceeds 50 μm, a part of the alloy is likely to crystallize, so that the characteristics may be deteriorated. The thickness of the amorphous alloy ribbon is more preferably from 11 μm to 30 μm, and still more preferably from 12 μm to 27 μm.

The width of the amorphous alloy ribbon is not particularly limited; however the width is preferably from 5 mm to 300 mm When the width of the amorphous alloy ribbon is 5 mm or more, the amorphous alloy ribbon is superior in production suitability. When the width of the amorphous alloy ribbon is 300 mm or less, the uniformity of nanocrystallization is further improved in the step of obtaining a nanocrystalline alloy ribbon. It is preferable that the width of the amorphous alloy ribbon is 200 mm or less.

In the embodiment of the present disclosure, the nanocrystalline alloy ribbon can also be prepared by providing a continuous line, in which the amorphous alloy ribbon is wound off from a wound body constituted of the amorphous alloy ribbon in a roll form, then the amorphous alloy ribbon is run while applying tension to the amorphous alloy ribbon, the traveling amorphous alloy ribbon is brought into contact with a heat transfer medium and is heated, nanocrystallyzation is caused by thermal treatment through the heating, to obtain a nanocrystalline alloy ribbon, and then the nanocrystalline alloy ribbon is wound into a wound body in a roll form.

One embodiment of the method of providing a continuous line and preparing a nanocrystalline alloy ribbon is explained with reference to FIG. 1. FIG. 1 shows an in-line annealing device 150, which is a device for performing an in-line annealing step, in which, through the route from the unwind roller 112 to the wind roller 114, a continuous thermal treatment step including a temperature elevating step and a temperature lowering (cooling) step is conducted with respect to the long amorphous alloy ribbon, thereby obtaining a nanocrystalline alloy ribbon.

The in-line annealing device 150 is equipped with an unwind roller 112 (unwinding device) which winds off an alloy ribbon 110 from a wound body 111 of the amorphous alloy ribbon, a heating plate (heat transfer medium) 122 which heats the alloy ribbon 110 that has been wound off from the unwind roller 112, a cooling plate (heat transfer medium) 132 which lowers the temperature of the alloy ribbon 110 heated by the heating plate 122, and a wind roller 114 (winding device) which winds up the alloy ribbon 110 whose temperature is lowered by the cooling plate 132. In FIG. 1, the traveling direction of the alloy ribbon 110 is indicated by an arrow R.

The unwind roller 112 is set to the wound body 111 of the amorphous alloy ribbon.

When the unwind roller 112 rotates around the shaft in the direction of the arrow U, the alloy ribbon 110 is wound off from the wound body 111 of the amorphous alloy ribbon.

In this example, it is possible that the unwind roller 112 itself has a rolling mechanism (for example, a motor), or it is possible that the unwind roller 112 itself does not have a rolling mechanism.

Also in the case in which the unwind roller 112 itself does not have a rolling mechanism, linked with the action of winding the alloy ribbon 110 by the wind roller 114 described below, the alloy ribbon 110 is wound off from the wound body 111 of the amorphous alloy ribbon, which is set to the unwind roller 112.

In FIG. 1, as shown in the enlarged part enclosed with a circle, the heating plate 122 includes a first plane 122S that comes into contact with the alloy ribbon 110 which has been wound off from the unwind roller 112. This heating plate 122 heats the alloy ribbon 110, that is running on the first plane 122S in the state of being in contact with the first plane 122S, through the first plane 122S. As a result, the running alloy ribbon 110 is stably and rapidly heated, and is nanocrystallized.

The heating plate 122 is connected to a heat source (not shown), and is heated to a desired temperature by the heat supplied from this heat source. Instead of being connected to a heat source or in addition to being connected to a heat source, the heating plate 122 may be provided with a heat source inside the heating plate 122 itself.

Examples of the material of the heating plate 122 include stainless steel, Cu, a Cu alloy, an Al alloy, and the like.

The heating plate 122 is stored in a heating chamber 120.

The heating chamber 120 may be provided with a heating source for controlling the temperature of the heating chamber, in addition to the heat source for the heating plate 122.

The heating chamber 120 has openings (not shown) on the upstream side and on the downstream side, respectively, in the traveling direction (the arrow R) of the alloy ribbon 110, where the alloy ribbon enters or exits. The alloy ribbon 110 enters into the heating chamber 120 through the entrance which is the opening on the upstream side, and exits from the inside of the heating chamber 120 through the exit which is the opening on the downstream side.

Further, in FIG. 1, as shown in the enlarged part enclosed with a circle, the cooling plate 132 includes a second plane 132S that comes into contact with the alloy ribbon 110. This cooling plate 132 lowers the temperature of the alloy ribbon 110, that is running on the second plane 132S in the state of being in contact with the second plane 132S, through the second plane 132S.

It is possible that the cooling plate 132 has a cooling mechanism (for example, a water cooling mechanism) or does not have a special cooling mechanism.

Examples of the material of the cooling plate 132 include stainless steel, Cu, a Cu alloy, an Al alloy, and the like.

The cooling plate 132 is stored in a cooling chamber 130.

It is possible that the cooling chamber 130 has a cooling mechanism (for example, a water cooling mechanism) or does not have a special cooling mechanism. That is, the embodiment of cooling by the cooling chamber 130 may be water cooling or may be air cooling.

The cooling chamber 130 has openings (not shown) on the upstream side and on the downstream side, respectively, in the traveling direction (the arrow R) of the alloy ribbon 110, where the alloy ribbon enters or exits. The alloy ribbon 110 enters into the cooling chamber 130 through the entrance which is the opening on the upstream side, and exits from the inside of the cooling chamber 130 through the exit which is the opening on the downstream side.

The wind roller 114 is provided with a rolling mechanism (for example, a motor) which rotates around the shaft in the direction of the arrow W. By the rotation of the wind roller 114, the alloy ribbon 110 is wound up at a desired speed.

The in-line annealing device 150 has, between the unwind roller 112 and the heating chamber 120, along the traveling route of the alloy ribbon 110, a guide roller 41, a dancer roller 60 (one of the tensile stress adjusting devices), a guide roller 42, and a pair of guide rollers 43A and 43B. Adjustment of the tensile stress is also conducted by the control of the action of the unwind roller 112 and the wind roller 114.

The dancer roller 60 is provided so as to be movable in the vertical direction (the direction of the double-sided arrow in FIG. 1). By adjusting the position of this dancer roller 60 in the vertical direction, the tensile stress of the alloy ribbon 110 can be adjusted.

As a result, thermal treatment for nanocrystallization can be performed with tension exerted on the amorphous alloy ribbon.

The alloy ribbon 110 that has been wound off from the unwind roller 112 is guided into the heating chamber 120 via these guide rollers and dancer roller.

The in-line annealing device 150 is equipped with a pair of guide rollers 44A and 44B and a pair of guide rollers 45A and 45B, between the heating chamber 120 and the cooling chamber 130.

The alloy ribbon 110 that has left the heating chamber 120 is guided into the cooling chamber 130 via these guide rollers.

The in-line annealing device 150 has, between the cooling chamber 130 and the wind roller 114, along the traveling route of the alloy ribbon 110, a pair of guide rollers 46A and 46B, a guide roller 47, a dancer roller 62, a guide roller 48, a guide roller 49, and a guide roller 50.

The dancer roller 62 is provided so as to be movable in the vertical direction (the direction of the double-sided arrow in FIG. 1). By adjusting the position of this dancer roller 62 in the vertical direction, the tensile stress of the alloy ribbon 110 can be adjusted.

The alloy ribbon 110 that has left the cooling chamber 130 is guided to the wind roller 114 via these guide rollers and dancer roller.

In the in-line annealing device 150, the guide rollers (43A, 43B, 44A, and 44B), which are arranged on the upstream side and on the downstream side of the heating chamber 120, have a function of adjusting the position of the alloy ribbon 110, to bring the alloy ribbon 110 in complete contact with the first plane of the heating plate 122.

In the in-line annealing device 150, the guide rollers (45A, 45B, 46A, and 46B), which are arranged on the upstream side and on the downstream side of the cooling chamber 130, have a function of adjusting the position of the alloy ribbon 110, to bring the alloy ribbon 110 in complete contact with the second plane of the cooling plate 132.

The step of causing the nanocrystalline alloy ribbon to be held on the resin film with an adhesive layer therebetween, according to the embodiment of the present disclosure, is explained with reference to FIG. 2.

Figure 2:
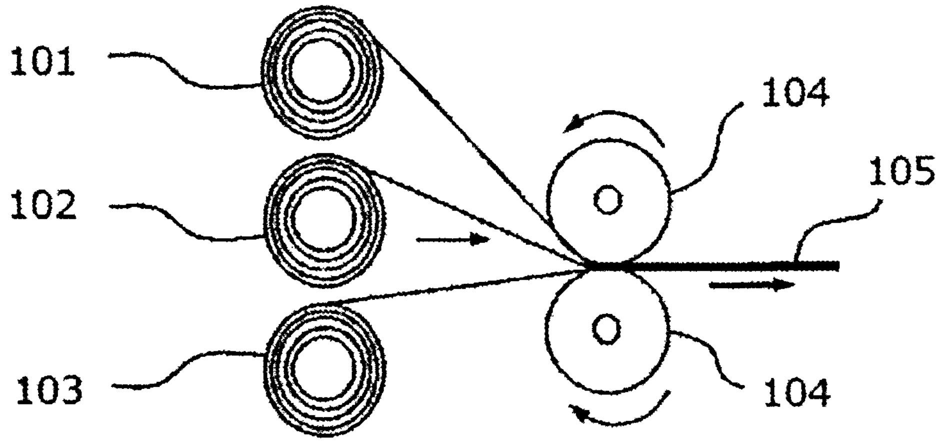
FIG. 2 is a schematic view of a laminating step showing one embodiment of the step of causing the nanocrystalline alloy ribbon to be held on the resin film with an adhesive layer therebetween according to the present disclosure.

FIG. 2 is an example of the laminating step, in which a nanocrystalline alloy ribbon 101, an adhesive layer 102, and a resin film 103 are drawn out from rolls, and stacked by sandwiching between a pair of pressure rollers 104 disposed at a predetermined interval to be integrated, thereby preparing a nanocrystalline alloy ribbon having a resin film 105. The laminating step is a specific example of the step of causing the nanocrystalline alloy ribbon to be held on the resin film with an adhesive layer therebetween. Here, in the case of preparing a multiply layer of nanocrystalline alloy ribbons, for example, a multilayer body of nanocrystalline alloy ribbons can be prepared by a step of stacking plurality of nanocrystalline alloy ribbons on the resin film. For example, by further stacking a required number of adhesive layers 102 and nanocrystalline alloy ribbons 101, on the nanocrystalline alloy ribbon having a resin film 105, a multilayer body of nanocrystalline alloy ribbons can be prepared. For example, in the laminating step shown in FIG. 2, plurality of nanocrystalline alloy ribbons 101, plurality of adhesive layers 102, and a resin film 103 are integrated by using a pair of pressure roller 104, so that a multilayer body of nanocrystalline alloy ribbons can be prepared. Further, a resin film may be layered on the opposite side of the nanocrystalline alloy ribbon from the resin film 103, to obtain a structure in which a nanocrystalline alloy ribbon is sandwiched between resin films. Further, instead of using the adhesive layer 102, layering can be performed by using a resin film with an adhesive layer formed thereon, such as a double-sided adhesive tape.

This nanocrystalline alloy ribbon having a resin film 105 may be cut into a needed shape and size to form a nanocrystalline alloy ribbon having a resin film with a shape suitable for intended use. In this case, the nanocrystalline alloy ribbon having a resin film 105 may be cut using a rotary blade type slitter or a shear blade type cutter. Alternatively, the nanocrystalline alloy ribbon having a resin film 105 may be punched and cut using a press die or the like.

In the embodiment of the present disclosure, a material and a thickness, with which easy deformation is realized and which achieve rich in bending property, are selected for the resin film. For example, a resin film such as a polyethylene terephthalate (PET) film having a thickness of from 10 μm to 100 μm is preferable. In addition, a resin film made from polyimide such as polyetherimide or polyamidoimide, polyamide, polyester such as polyethylene terephthalate, or the like may be used. Further, polypropylene, polyethylene, polystyrene, polycarbonate, polysulfone, polyether ketone, polyvinyl chloride, polyvinyl alcohol, a fluoro resin, an acryl resin, cellulose, or the like can be used. From the viewpoints of heat resistance and dielectric loss, polyamide and polyimide are particularly preferable.

When the thickness of the resin film is increased, the resin film is less likely to be deformed, which may lead to inhibition of disposing of the nanocrystalline alloy ribbon having a resin film along a curved surface or a bent surface. When the thickness is less than 10 μm, the resin film itself is more easily deformed, which makes it difficult to treat the resin film, and there are cases in which the function of supporting the nanocrystalline alloy ribbon is not obtained sufficiently.

A liquid-like, sheet-like, or tape-like adhesive, such as an acrylic resin or a silicone resin, can be applied to the adhesive layer that bonds the resin film and the nanocrystalline alloy ribbon together. A liquid adhesive may be thinly coated on one surface side of the resin film to form an adhesive layer, or a resin film onto which a double-sided adhesive tape is previously stuck may be used. An electronic conductor, such as a Cu foil or an Al foil, having a thickness of from about 5 μm to about 30 μm may be provided on the surface of the resin film opposite from the surface on the side to which the nanocrystalline alloy ribbon is to be attached or between the amorphous alloy ribbon and the resin film, for the purpose of imparting a function of electromagnetic wave shielding.

The nanocrystalline alloy ribbon may be subjected to a crack treatment of applying an external force by applying pressure to the nanocrystalline alloy ribbon, using a member such as a roller or the like, in the state in which the nanocrystalline alloy ribbon is held on the resin film. As a result, the nanocrystalline alloy ribbon may be divided into a plurality of fixed size pieces or irregular size pieces. In this case, the crack-treated nanocrystalline alloy ribbon is preferably sandwiched by covering the crack-treated nanocrystalline alloy ribbon with a covering layer such as other resin film or an adhesive layer, so that the piece of the crack-treated nanocrystalline alloy ribbon or the like does not fall off from the resin film. Although the nanocrystalline alloy ribbon becomes brittle and can be cracked relatively easily by applying pressure, conventionally, it was not possible to sufficiently reduce the magnetic permeability. However, in the present disclosure, a nanocrystalline alloy ribbon which has been subjected to a thermal treatment for nanocrystallization with tension exerted thereon is used, and since this nanocrystalline alloy ribbon has a low magnetic permeability, the AC relative magnetic permeability μr can be easily adjusted to be within the range of from 100 to 2,000 at 128 kHz. In the present disclosure, the term "crack" refers to a magnetic gap formed in the alloy ribbon, and includes, for example, a break and/or a fissure in the alloy ribbon.

When the nanocrystalline alloy ribbon is divided into a plurality of pieces by performing a crack treatment, an effect of reduction in eddy current loss can be obtained. However, when the obtained pieces are in an excessive irregular form, there is a risk of causing problems such as change in characteristics according to a region in the nanocrystalline alloy ribbon. Therefore, it is desirable to divide the nanocrystalline alloy ribbon into fixed size pieces, if possible. The shape of the pieces is preferably a rectangle in which the length of one side is from 1 mm to 10 mm.

In the case of performing a crack treatment, in order to bring the shape of the piece closer to a fixed size form, the method is thought to include a step (a crack starting point treatment) of applying an external force to plurality of places on the surface of the nanocrystalline alloy ribbon and a step (a crack treatment) of winding the nanocrystalline alloy ribbon with a resin film using a roll, to generate cracks in which the starting point is the place to which an external force has been applied, and dividing the nanocrystalline alloy ribbon into plurality of pieces, after the step (for example, the laminating step shown in FIG. 2) of causing the nanocrystalline alloy ribbon to be held on the resin film with an adhesive layer therebetween. By performing a crack starting point treatment with respect to the nanocrystalline alloy ribbon that has been subjected to the step (for example, the laminating step shown in FIG. 2) of causing the nanocrystalline alloy ribbon to be held on the resin film with an adhesive layer therebetween, when the nanocrystalline alloy ribbon is wound around a roll and bending stress is applied to the nanocrystalline alloy ribbon, cracks are formed at moderate intervals, which provides fixed size pieces.

[Crack Treatment]

A crack can be formed, for example, by pressing a convex member against the surface of the nanocrystalline alloy ribbon. The shape of the convex member may be, for example, a rod shape or a cone shape. The tip of the end part of the convex member may be flat, cone-like, reverse cone-like with a recess in the center, or tubular.

In the formation of cracks, a press member in which plurality of convex members are regularly arranged can be used. For example, formation of cracks can be conducted by using a roll (hereinafter, referred to as a cracking roll) in which a plurality of convex members are arranged on the peripheral surface. For example, cracks can be formed continuously, by pressing the long nanocrystalline alloy ribbon against the cracking roll using tension or the like, or by transporting the long nanocrystalline alloy ribbon to pass between the cracking rolls. Further, cracks can be formed by using plurality of cracking rolls.

Figure 3:
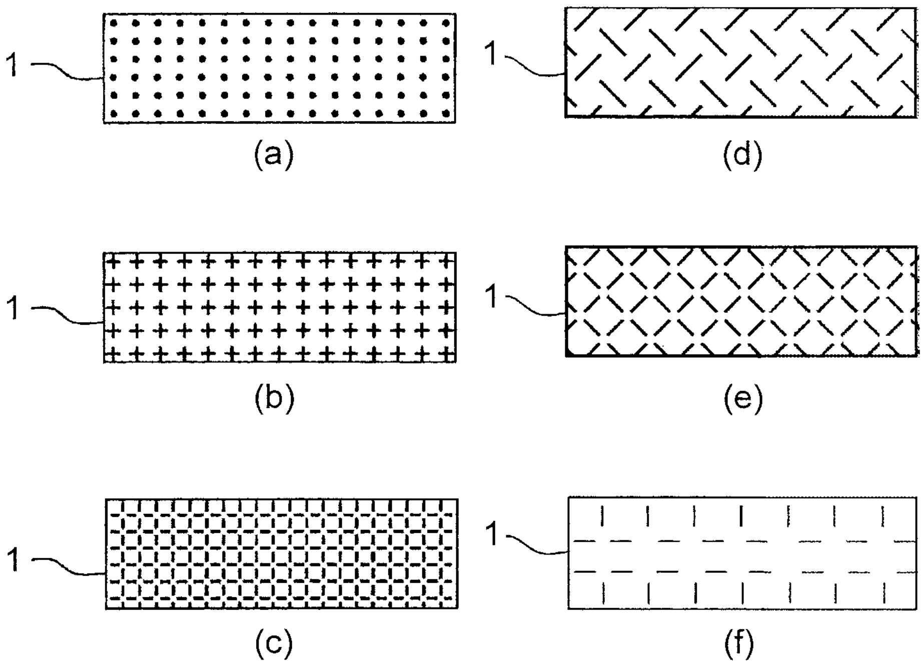
FIG. 3 is a plane view of a nanocrystalline alloy ribbon in the embodiment of the present disclosure, which conceptually shows the places to which an external force is applied.

FIG. 3 is a plane view of a nanocrystalline alloy ribbon having a resin film, which conceptually shows the places to which an external force is regularly applied by using plurality of convex members. The shape of the pattern corresponds to the shape of the tip of the convex member in the portion to which the external force is applied.

FIG. 3(*a*) conceptually shows the places to which an external force is applied, in the case of using a convex member in which the shape of the cross-section of the end part is a round shape.

FIG. 3(*b*) conceptually shows the places to which an external force is applied, in the case of using a convex member in which the outward form of the end part is a cross shape.

FIG. 3(*c*) conceptually shows the places to which an external force is applied, in the case of using each of a convex member in which the outward form of the end part is linear in the vertical direction of the figure and a convex member in which the outward form of the end part is linear in the horizontal direction. In this figure, the places to which an external force is applied are each arranged so as to be non-continuous, and also, to be in a matrix form.

FIG. 3(*d*) conceptually shows the places to which an external force is applied, in the case of using a convex member in which the outward form of the end part is a line inclined by θ° (inclined by 45° in FIG. 3(*d*)) with respect to the vertical direction of the figure, and a convex member in which the outward form of the end part is a line inclined by −θ° (inclined by −45° in FIG. 3(*d*)). In this figure, the places to which an external force is applied are each arranged so as to be non-continuous, and also, the place to which one linear external force is to be applied is arranged so as to intersect, on its extension line, between the two ends of the places to which other external force is to be applied.

FIG. 3(*e*) conceptually shows the places to which an external force is applied, in the case of using a convex member in which the outward form of the end part is a line inclined by θ° (inclined by 45° in FIG. 3(*e*)) with respect to the vertical direction of the figure, and a convex member in which the outward form of the end part is a line inclined by −θ° (inclined by −45° in FIG. 3(*e*)) line. In this figure, the places to which an external force is applied are each arranged so as to be non-continuous, and also, to be in an inclined matrix form.

FIG. 3(*f*) conceptually shows the places to which an external force is applied, in the case of using each of a convex member in which the outward form of the end part is linear in the vertical direction of the figure and a convex member in which the outward form of the end part is linear in the horizontal direction. In this figure, the positional relationship is changed, with respect to FIG. 3(*c*). The arrangement of the convex members is not limited to that shown in the figure, and can be set as appropriate.

Concerning the places to which these external forces are applied, it is desirable that cracks having exactly the same form as the form of the places to which these external forces are applied are formed. However, there may be a case in which other cracks are formed, or a case in which cracks having the same form are not formed (cracks are formed only partially).

Further, cracks may be linear, and plurality of cracks may be formed so as to be connected continuously.

In the case of forming the cracks of FIG. 3(*c*), FIG. 3(*d*), FIG. 3(*e*), or FIG. 3(*f*), cracks can be formed by arranging one convex member on a cracking roll and arranging the other convex member on another cracking roll, and directly applying an external force to the alloy ribbon using the two cracking rolls in order.

After forming cracks by directly applying an external force to the nanocrystalline alloy ribbon using a convex member, a second external force can be applied by a means, such as bending or winding up the nanocrystalline alloy ribbon. In this way, with the crack as the starting point of brittle fracture or crack destruction, a break and/or a fissure which connects the cracks (a magnetic gap that connects the cracks together) can be formed. Hereinafter, this break and/or fissure (a magnetic gap) which connects the cracks together may be referred to as a network crack.

In the nanocrystalline alloy ribbon having a resin film according to the embodiment of the present disclosure, an embodiment in the case of forming cracks in the nanocrystalline alloy ribbon and layering the nanocrystalline alloy ribbons having the cracks formed therein in multilayer is explained with reference to FIG. 4.

First, a thermal treatment for nanocrystallization is performed with tension exerted on the nanocrystallizable amorphous alloy ribbon, thereby forming a nanocrystalline alloy ribbon. The steps described below are performed using this nanocrystalline alloy ribbon.

Four wound bodies in a roll form, in which the nanocrystalline alloy ribbon is wound in a roll form, are prepared. Note that, the number of the wound bodies is not limited to four, and the number of the wound bodies can be set as appropriate.

Then, the following steps are performed. The specific product names and the numerical values shown below are examples for explaining the steps in detail.

Step (1) "Step of adhering the nanocrystalline alloy ribbon to an adhesive layer of a tape for cracking, the tape having the adhesive layer and a release film that can be peeled off from the adhesive layer"

First, rolls around which a double-sided tape 2A is wound are arranged at four places. The number of rolls is adjusted to the number of wound bodies of the nanocrystalline alloy ribbon which is wound in a roll form. Thereafter, the double-sided tape 2A is wound off from the roll. The double-sided tape 2A has a three-layer structure including a release film 1A (25 μm), an adhesive layer (5 μm), and a release film 1B (25 μm). The release film 1A and the release film 1B are made from the same material (PET) and have a tensile elastic force of 3.9 GPa. As to the adhesive layer, an acrylic adhesive is coated on the two sides of a substrate film. The release film 1A and the release film 1B can be peeled off from the adhesive layer.

The release film 1A is peeled off from the double-sided tape 2A. This peeling is performed at almost the same timing that the double-sided tape 2A is drawn out from the roll. In the embodiment of the present disclosure, the tape constituted of the adhesive layer and the release film 1B thus obtained is used as the tape for cracking. Here, the release film 1B is a kind of a resin film.

Thereafter, the nanocrystalline alloy ribbon 4 is drawn out from the wound body in a roll form, and is adhered to the adhesive layer in the tape for cracking, using a contact-bonding roll. The nanocrystalline alloy ribbon 4 is an alloy ribbon (trade name FT-3, manufactured by HITACHI METALS, LTD.) made from a Fe—Cu—Nb—Si—B-based nanocrystalline alloy.

Here, it is preferable that the release film is a release film made from a resin having elasticity.

Figure 4:
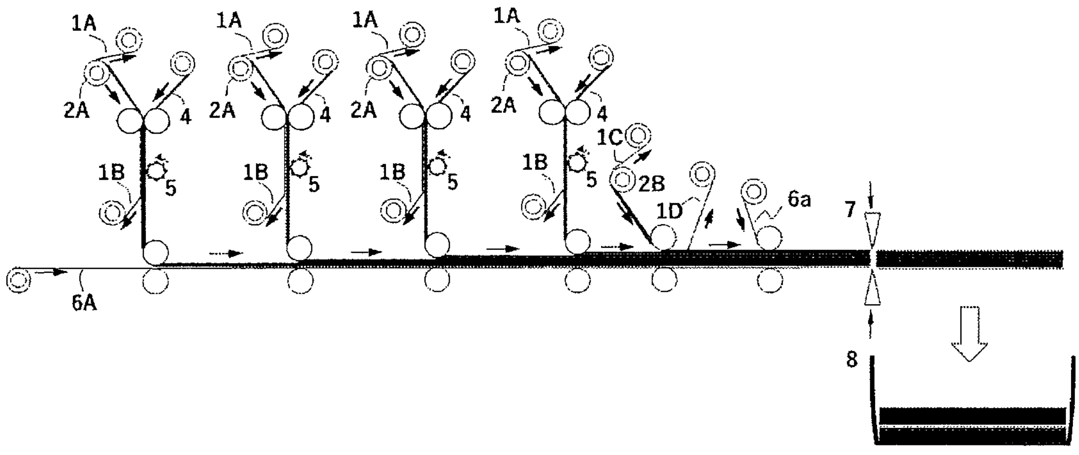
FIG. 4 is a diagram showing a manufacturing apparatus according to the embodiment of the present disclosure, in which a plurality of crack-formed nanocrystalline alloy ribbons are layered on the resin film.

As shown in FIG. 4, in one embodiment, the method for producing a nanocrystalline alloy ribbon having a resin film includes a step (Step (1)) of adhering a nanocrystalline alloy ribbon to a tape for cracking, the tape having an adhesive layer and a release film that can be peeled off from the adhesive layer, and a step (Step (2) described below) of directly applying an external force to the nanocrystalline alloy ribbon to form a crack. In this case, when the release film is made from a resin, owing to the elastic force of the release film, the occurrence itself of unevenness in the surface of the nanocrystalline alloy ribbon is suppressed. Further, even if unevenness occurs in the surface of the nanocrystalline alloy ribbon, owing to the elastic force, the unevenness is deformed to be flat. As a result, a nanocrystalline alloy ribbon in a favorably flat state can be prepared, and a nanocrystalline alloy ribbon with a resin film, which has little change with time in magnetic properties can be obtained.

For example, as the resin of the release film, a resin having a lower limit of tensile elasticity of 0.1 GPa can be used. When the tensile elasticity is 0.1 GPa or more, the effect described above is likely to be obtained sufficiently. The lower limit of the tensile elasticity is preferably 0.5 GPa, and more preferably 1.0 GPa. The upper limit of the tensile elasticity is preferably 10 GPa. When the tensile elasticity exceeds 10 GPa, deformation of the alloy ribbon may be suppressed in forming a crack. The upper limit of the tensile elasticity is preferably 7 GPa, and more preferably 5 GPa.

Further, as to the release film, it is preferable to use a resin having a thickness of from 1 μm to 100 μm. When the thickness of the release film increases, it becomes difficult to cause deformation. When the thickness of the release film is less than 1 μm, the release film itself is deformed more easily, so that it becomes difficult to handle.

The same material can be used for the adhesive layer as the material used for the adhesive layer of the resin film. For example, a conventionally known material can be used for the adhesive layer and, for example, a pressure sensitive adhesive can be used. As the pressure sensitive adhesive, for example, a pressure sensitive adhesive such as acrylic, silicone-based, urethane-based, a synthetic rubber, or a natural rubber can be used.

Step (2) "Step of directly applying an external force to the nanocrystalline alloy ribbon to form a crack"

Cracks are formed by directly applying an external force to the nanocrystalline alloy ribbon 4 adhered to the tape for cracking, using a cracking roll 5. In the cracking roll 5, convex members are regularly arranged on the peripheral surface. In forming cracks, a compression roll which pushes the nanocrystalline alloy ribbon 4 to the cracking roll side can be arranged on the release film 1B side, such that the external force from the cracking roll is not released.

Step (3) "Step of peeling the release film from the adhesive layer, to form a sheet member having an adhesive layer and a nanocrystalline alloy ribbon with cracks formed therein"

The release film 1B is peeled off from the tape for cracking, to expose the adhesive layer. In this way, a sheet member having an adhesive layer and a nanocrystalline alloy ribbon with cracks formed therein is formed. By utilizing the external force against the nanocrystalline alloy ribbon 4, the external force being generated when peeling the release film 1B, a network crack can be formed.

In FIG. 4, four structures of Step (1) to Step (3) are provided. However, the number of the structure is not limited to four, and the number may be five or more, or may be three or less, according to the purpose.

Note that, in the case of layering the nanocrystalline alloy ribbons in multilayer, concerning the lowermost nanocrystalline alloy ribbon, the release film is left as it is, and the release film may be used as the resin film of the nanocrystalline alloy ribbon having a resin film.

Step (4) "Step of forming a nanocrystalline alloy ribbon having a resin film"

A sheet member is layered on a resin film 6A and is bonded, using a contact-bonding roll. Layering is performed such that the adhesive layer of the sheet member contacts the resin film. Further, on the assembly, the next sheet member is layered and bonded, using a contact-bonding roll. By repeating this operation, the adhesive layer and the nanocrystalline alloy ribbon are layered alternately. In this way, a nanocrystalline alloy ribbon having the resin layer 6A is formed.

Further, in FIG. 4, a resin film 6*a* is adhered onto the layered nanocrystalline alloy ribbons. The resin film 6*a* is adhered to the layered body of the nanocrystalline alloy ribbons with an adhesive layer of another double-sided tape 2B sandwiched therebetween. The double-sided tape 2B has a three-layer structure including a release film 1C, an adhesive layer (5 μm), and a release film 1D. The release film 1C and the release film 1D can be peeled off from the adhesive layer. The release film 1C is peeled off from the double-sided tape 2B, and the exposed adhesive layer and the nanocrystalline alloy ribbon 4 are bonded using a contact-bonding roll. Then, the release film 1D is peeled off. Thereafter, the resin film 6*a* is contact-bonded to the adhesive layer of the double-sided tape 2B. The resin film 6*a* is a protective film made from PET, which has a thickness of 25 μm.

Note that, the resin film 6A has a two-layer structure including an adhesive layer having a thickness of 5 μm, and a resin film having a thickness of 75 μm. Here, this resin film can be peeled off from the adhesive layer. The adhesive layer of the sheet member and the adhesive layer of the resin film are bonded using a contact-bonding roll. When the resin film is peeled off, the adhesive layer is exposed, and it becomes possible to adhere the nanocrystalline alloy ribbon to an electronic device or the like.

Thereafter, the nanocrystalline alloy ribbon having a resin film is cut into a required size using a cutter 7 and is transported to a tray 8. Instead of using the cutter 7, the nanocrystalline alloy ribbon having a resin film can be processed into a desired form using a punching machine or the like.

Figure 5:
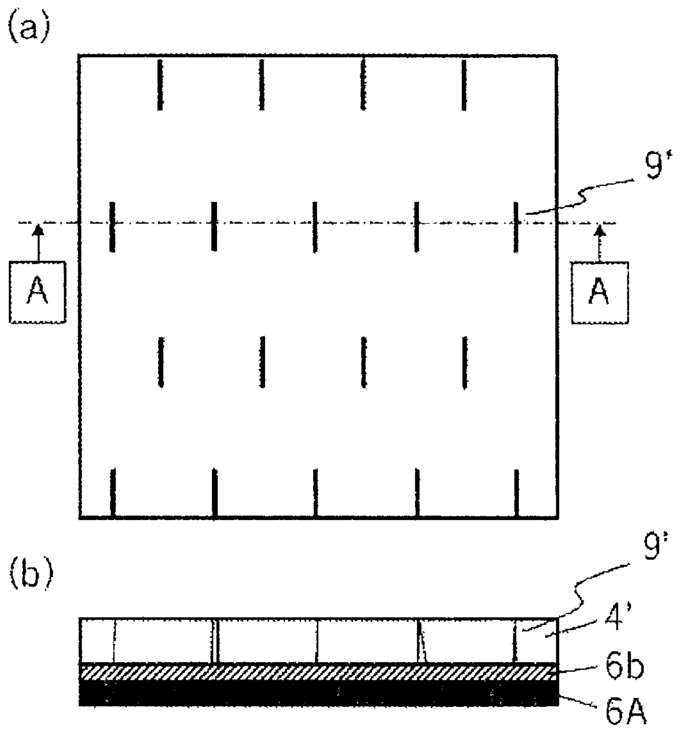
FIG. 5 is a plane view (a) and a cross sectional view (b) each showing one example of the nanocrystalline alloy ribbon having a resin film according to the present disclosure.

A plane view (a) and a cross sectional view (b) each schematically showing a nanocrystalline alloy ribbon having a resin film, in which a sheet member is layered on a resin film 6A, are shown in FIG. 5. Here, the cross sectional view (b) is a cross sectional view along the line A-A in the plane view (a). A nanocrystalline alloy ribbon 4' is layered and bonded to the resin film 6A with an adhesive layer 6*b* sandwiched therebetween. Further, cracks 9' are formed in the nanocrystalline alloy ribbon 4'. The cracks 9' are formed by pressing a cracking roll in which linear convex members are arranged regularly on the peripheral surface, and linear cracks 9' are formed intermittently.

Figure 6:
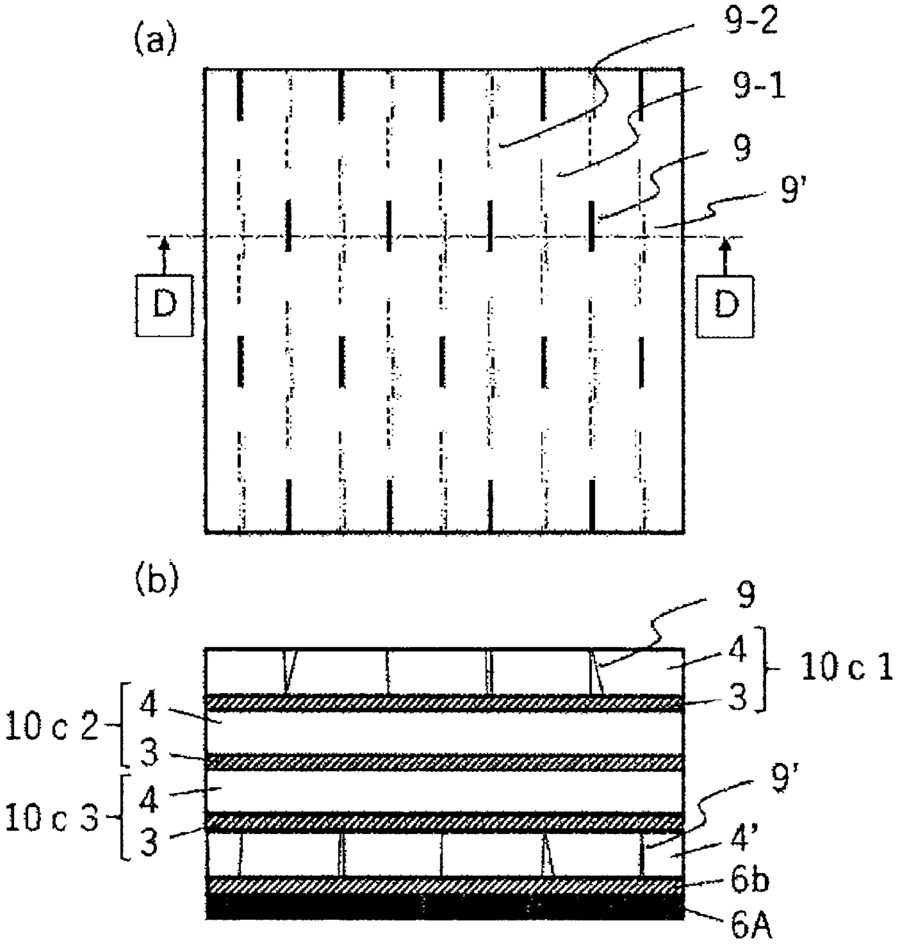
FIG. 6 is a plane view (a) and a cross sectional view (b) each showing another example of the nanocrystalline alloy ribbon having a resin film according to the present disclosure.

A plane view (a) and a cross sectional view (b) each schematically showing a nanocrystalline alloy ribbon having a resin film, in which plurality of nanocrystalline alloy ribbons are layered on the resin film 6A, are shown in FIG. 6. Here, the cross sectional view (b) is a cross sectional view along the line D-D in the plane view (a).

As shown in FIG. 6(*a*), a sheet member 10*c*1 to a sheet member 10*c*3 are layered on a nanocrystalline alloy ribbon 4' adhered to a resin film 6A. The cracks 9, 9-1, and 9-2 which are formed in the first sheet member 10*c*1 to the third sheet member 10*c*3, respectively, and the crack 9' formed in the nanocrystalline alloy ribbon 4' bonded to the resin film 6A are each formed in a different position when viewed in the layering direction. As described above, in the preferred embodiment of the present disclosure, cracks are formed by directly applying an external force to each of the nanocrystalline alloy ribbons. Therefore, unlike the conventional production method in which cracks are formed in plurality of nanocrystalline alloy ribbons at the same time, the position of crack can be changed for every layer of the nanocrystalline alloy ribbon. As a result, a nanocrystalline alloy ribbon having a resin film, in which magnetic gaps are equally formed, can be prepared. Therefore, even if this nanocrystalline alloy ribbon with a resin film is further subjected to processing such as punching or cutting into a desired form, the variety in magnetic permeability according to the processing position is low, and a nanocrystalline alloy ribbon with a resin film, which has stable shielding characteristics, can be produced.

Another resin film can be layered on the opposite side of this nanocrystalline alloy ribbon with a resin film from the resin film 6A in the layering direction. Both of the resin films can be bonded through an adhesive layer (for example, a double-sided tape).

In a preferred embodiment of the present disclosure, cracks are formed not after layering the nanocrystalline alloy ribbon but before layering the alloy ribbon, and by directly applying an external force to the alloy ribbon. Thus, the external force to be applied is directly added to the alloy ribbon, and moreover, the external force has only the strength for making cracks in one layer of the alloy ribbons. Accordingly, cracks can be formed with a smaller external force than that in the method of forming cracks in plurality of alloy ribbons at the same time or in the method of applying an external force from the top of the protective film to form cracks. Since the external force for forming cracks is small, the unevenness of the surface of the nanocrystalline alloy ribbon having cracks formed therein can be suppressed, and the planar state of the nanocrystalline alloy ribbon can be made favorable.

Figure 7:
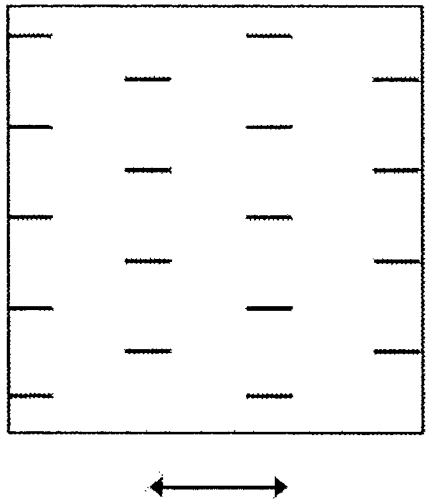
FIG. 7 is a plane view showing the appearance of cracks in the nanocrystalline alloy ribbon having a resin film according to the present disclosure.

In the present disclosure, in the case of forming linear cracks in the nanocrystalline alloy ribbon, for example, as shown in FIG. 7, it is preferable to form cracks parallel to the casting direction (corresponds to the longitudinal direction in the case of casting (rapid solidification) continuously by roll cooling, and is the direction along the rotation direction of the roll) of the nanocrystalline alloy ribbon. Note that, the arrow shown in FIG. 7 indicates the casting direction.

The results of evaluation on the AC relative magnetic permeability μr (at 128 kHz) of the magnetic sheet (explained in FIG. 4), which is one example of the nanocrystalline alloy ribbon having a resin film according to the present disclosure, are shown in Table 1. Here, the results of evaluation with regard to two samples are shown. With regard to the magnetic sheet obtained by the method for producing a nanocrystalline alloy ribbon having a resin film according to the present disclosure, the rate of change after 300 days was about 3% or about 3% or less.

With regard to a conventional magnetic sheet (a magnetic sheet, in which four alloy ribbons that are layered with an adhesive layer therebetween are sandwiched between two resin films, and cracks are formed by applying an external force from the top of the resin film), the rate of change was from about 7% to about 10% after aging 100 hours. However, in the embodiment of the present disclosure, even after 300 days (after 7,200 hours), the rate of change was about 3% or about 3% or less. According to the embodiment of the present disclosure, a magnetic sheet exhibiting a small change in magnetic permeability is obtained.

TABLE 1

| No. | Initial Stage | After 300 Days | Rate of Change |
|---|---|---|---|
| 1 | 1.085 | 1.053 | 3.0% |
| 2 | 1.009 | 1.029 | −2.0% |

Figure 8:
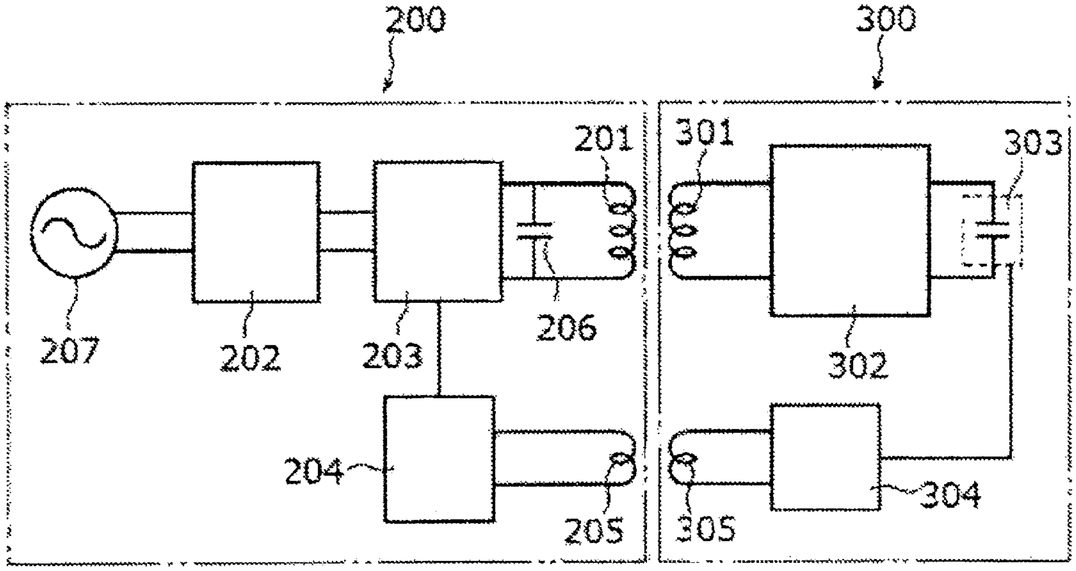
FIG. 8 is a diagram showing a circuit configuration of one example of a wireless charging device, as one example of an application product using the nanocrystalline alloy ribbon having a resin film according to the embodiment of the present disclosure.

The nanocrystalline alloy ribbon having a resin film according to the embodiment of the present disclosure can be applied to a magnetic sheet. As one example of the application product of the magnetic sheet, a circuit configuration in one example of a wireless charging device is shown in FIG. 8. The power feeding device 200 is provided with a power feeding unit 207 that supplies alternating current, a rectifier circuit 202 which is connected to the power feeding unit 207 in order to rectify the alternating current to direct current, a switching circuit 203 which inputs the direct current and changes the direct current to a high frequency current having predetermined frequency, a primary transmission coil 201 which is connected to the switching circuit 203 so as to let the high frequency current flow, a resonance capacitor 206 which is connected in parallel to the primary transmission coil 201 so as to resonate with the switching circuit 203 at the same frequency, a control circuit 204 which is connected to the switching circuit 203, and a primary coil for control 205 which is connected to the control circuit 204. The control circuit 204 controls the action of the switching circuit 203 based on the induction current obtained from the primary coil for control 205.

The power receiving device 300 is provided with a secondary transmission coil 301 which receives the magnetic flux generated from the primary transmission coil 201, a rectifier circuit 302 which is connected to the secondary transmission coil 301, a secondary battery 303 which is connected to the rectifier circuit 302, a battery control circuit 304 which is connected to the secondary battery 303 in order to detect the storage condition from the voltage of the secondary battery 303, and a secondary coil for control 305 which is connected to the battery control circuit 304. A resonance capacitor (not shown) may be connected in parallel to the secondary transmission coil 301. The rectified current is stored in the secondary battery 303 and also, for example, is utilized to an electronic circuit, a driving member (not shown), or the like. The battery control circuit 304 sends a signal to the secondary coil for control 305, the signal being for performing the best charge according to the storage condition of the secondary battery 303. For example, in a case in which the secondary battery 303 is completely charged, a signal of the information is sent to the secondary coil for control 305, and the signal is conveyed to the control circuit 204 in the power feeding device 200 via the primary coil for control 205 which couples electromagnetically with the secondary coil for control 305. The control circuit 204 stops the switching circuit 203 based on the signal.

In the wireless charging device described above, the magnetic sheet is provided, as a coil yoke of the primary transmission coil 201, on the opposite side of the primary transmission coil 201 from the side that faces the secondary transmission coil 301. The magnetic sheet improves the bonding property between the primary transmission coil 201 and the secondary transmission coil 301, as well as plays a role of a shield between the primary transmission coil 201 and other components or the like. Further, the magnetic sheet according to the embodiment of the present disclosure is provided on the opposite side of the secondary transmission coil 301 from the side that faces the primary transmission coil 201. The magnetic sheet improves the bonding property between the primary transmission coil 201 and the secondary transmission coil 301, as well as plays a role of a shield between the secondary transmission coil 301 and other components (secondary battery) or the like.

Further, the nanocrystalline alloy ribbon having a resin film according to the embodiment of the present disclosure can also be used by forming it into a block-shaped laminated body or a toroidal shape. For example, the nanocrystalline alloy ribbon having a resin film can be used as an induction element or the like.

EXAMPLES

Hereinafter, the present disclosure is described in detail with reference to Examples. However, the present disclosure is by no means limited to the following Examples.

Example 1

[Production of Nanocrystalline Alloy Ribbon]

Using a manufacturing apparatus having the constituent elements shown in FIG. 1, a long amorphous alloy ribbon (Fe—Cu—Nb—Si—B-based alloy) was heat-treated with tension exerted on the amorphous alloy ribbon, thereby producing a long nanocrystalline alloy ribbon (Fe—Cu—Nb—Si—B-based alloy). The tension applied to the amorphous alloy ribbon was 40 MPa. The end-point temperature of the amorphous alloy ribbon in the thermal treatment was 600° C. The thickness of the nanocrystalline alloy ribbon was 16 μm.

[Production of Nanocrystalline Alloy Ribbon Having Resin Film]

Next, using a manufacturing apparatus having the constituent elements shown in FIG. 4, four sheet members, each having a two-layer structure including a nanocrystalline alloy ribbon and an adhesive layer, were sequentially layered on a resin film having a two-layer structure including a resin film made from PET and an adhesive layer. According to the manner described above, a nanocrystalline alloy ribbon having a resin film was produced. Cracks are formed in each of the nanocrystalline alloy ribbon contained in the nanocrystalline alloy ribbon having a resin film. The AC relative magnetic permeability μr of the nanocrystalline alloy ribbon, which was measured using the nanocrystalline alloy ribbon having a resin film, is as shown in Table 1.

Comparative Example 1

A nanocrystalline alloy ribbon and a nanocrystalline alloy ribbon having a resin film were each prepared in a manner substantially similar to that in Example 1, except that the thermal treatment was performed without applying tension. The AC relative magnetic permeability μr of the nanocrystalline alloy ribbon measured using the nanocrystalline alloy ribbon having a resin film was about 12,000.

The disclosures of Japanese Patent Application No. 2019-095278 filed on May 21, 2019 and Japanese Patent Application No. 2019-095279 filed on May 21, 2019 are incorporated by reference herein in their entirety. All publications, patent applications, and technical standards mentioned in this specification are herein incorporated by reference to the same extent as if such individual publication, patent application, or technical standard was specifically and individually indicated to be incorporated by reference.

EXPLANATION OF SYMBOLS

- 1, 105: Nanocrystalline alloy ribbon having a resin film
- 1A, 1B, 1C, 1D: Release film
- 2A, 2B: Double-sided tape
- 3, 6*b*, 102: Adhesive layer
- 4, 4', 101, 110: Nanocrystalline alloy ribbon
- 5: Cracking roll
- 6A, 6*a*, 103: Resin film
- 7: Cutter
- 8: Tray
- 9, 9', 9-1, 9-2: Crack
- 10*c*1, 10*c*2, 10*c*3: Sheet member
- 41, 42, 43A, 43B, 44A, 44B, 45A, 45B, 46A, 46B, 47, 48, 49, 50: Guide roller
- 112: Unwind roller
- 114: Wind roller
- 122: Heating plate (heat transfer medium)

132: Cooling plate (heat transfer medium)
60, 62: Dancer roller
104: Pressure roller
150: In-line annealing device
200: Power feeding device
201: Primary transmission coil
202: Rectifier circuit
203: Switching circuit
204: Control circuit
205: Primary coil for control
206: Resonance capacitor
207: Power feeding unit
300: Power receiving device
301: Secondary transmission coil
302: Rectifier circuit
304: Battery control circuit
305: Secondary coil for control

The invention claimed is:

1. A method for producing a nanocrystalline alloy ribbon having a resin film, the method comprising:

producing a plurality of sheet members, in which each of the plurality of sheet members comprises a crack-formed nanocrystalline alloy ribbon and an adhesive layer, by producing each of the plurality of sheet members by producing the crack-formed nanocrystalline alloy ribbon having a release film, in which a nanocrystalline alloy ribbon in which a crack has been formed is held on a first resin film serving as the release film with the adhesive layer therebetween, and then peeling the release film from the adhesive layer; and stacking the plurality of the sheet members on a second resin film, thereby stacking the crack-formed nanocrystalline alloy ribbons on the second resin film with the adhesive layers therebetween, and thereby obtaining the nanocrystalline alloy ribbon having a resin film in which the crack in each of the crack-formed nanocrystalline alloy ribbons is formed at a different position as viewed in the stacking direction;

wherein, the number of the plurality of the sheet members is three or more, and wherein, the producing the crack-formed nanocrystalline alloy ribbon having a release film comprising;

preparing an amorphous alloy ribbon capable of nanocrystallization, performing a thermal treatment for nanocrystallization of the amorphous alloy ribbon, with tension exerted on the amorphous alloy ribbon, to obtain a nanocrystalline alloy ribbon, causing the nanocrystalline alloy ribbon to be held on the release film with the adhesive layer therebetween, and forming a crack in the nanocrystalline alloy ribbon;

wherein an AC relative magnetic permeability μr of the nanocrystalline alloy ribbon in which the crack has been formed is from 100 to 2,000 at 128 kHz, wherein the forming the crack in the nanocrystalline alloy ribbon includes applying an external force directly to the nanocrystalline alloy ribbon, wherein, the release film has a thickness of from 10 μm to 100 μm, wherein, the release film comprises polyimide, polyamide, polyester, polypropylene, polyethylene, polystyrene, polycarbonate, polysulfone, polyether ketone, polyvinyl chloride, polyvinyl alcohol, a fluoro resin, an acryl resin, or cellulose, and wherein, in the nanocrystalline alloy ribbon having a resin film, positions of cracks in each of two adjacent crack-formed nanocrystalline alloy ribbons do not overlap at all, as viewed in the stacking direction.

2. The method for producing a nanocrystalline alloy ribbon having a resin film according to claim 1, wherein, the number of the plurality of the sheet members is five or more.

3. The method for producing a nanocrystalline alloy ribbon having a resin film according to claim 1, wherein the amorphous alloy ribbon is an amorphous alloy ribbon having a longitudinal shape produced by roll cooling, and obtaining a nanocrystalline alloy ribbon comprises allowing the amorphous alloy ribbon to proceed in a longitudinal direction of the amorphous alloy ribbon, while applying tension to the amorphous alloy ribbon in the longitudinal direction, and continuously performing thermal treatment for nanocrystallization with respect to the amorphous alloy ribbon.

4. The method for producing a nanocrystalline alloy ribbon having a resin film according to claim 1, wherein the nanocrystalline alloy ribbon includes a composition represented by the Formula: (Fe1-aMa)100-x-y-z-α-β-γCuxSiyBzM'αM"βXγ (atom %), wherein, in the Formula, M represents Co and/or Ni, M' represents at least one element selected from the group consisting of Nb, Mo, Ta, Ti, Zr, Hf, V, Cr, Mn, and W, M" represents at least one element selected from the group consisting of Al, platinum group elements, Sc, rare-earth elements, Zn, Sn, and Re, X represents at least one element selected from the group consisting of C, Ge, P, Ga, Sb, In, Be, and As, and a, x, y, z, α, β, and γ satisfy 0≤a≤0.5, 0.1≤x≤3, 0≤y≤30, 0≤z≤25, 5≤y+z≤30, 0≤α≤20, 0≤β≤20, and 0≤γ≤20, respectively.

5. The method for producing a nanocrystalline alloy ribbon having a resin film according to claim 4, wherein, in the Formula, a, x, y, z, α, β, and γ satisfy 0≤a≤0.1, 0.7≤x≤1.3, 12≤y≤17, 5≤z≤10, 17≤y+z≤27, 1.5≤α≤5, 0≤β≤1, and 0≤γ≤1, respectively.

* * * * *